(12) United States Patent
Lee (10) Patent No.: US 12,397,670 B2
(45) Date of Patent: Aug. 26, 2025

(54) METHOD FOR CONTROL DUAL BATTERIES IN HYBRID ELECTRIC VEHICLE

(71) Applicants: Hyundai Motor Company, Seoul (KR); Kia Corporation, Seoul (KR)

(72) Inventor: Minwoo Lee, Suwon-si (KR)

(73) Assignees: Hundai Motor Company, Seoul (KR); Kia Corporation, Seoul (KR)

(*) Notice: Subject to any disclaimer, the term of this patent is extended or adjusted under 35 U.S.C. 154(b) by 744 days.

(21) Appl. No.: 17/576,624

(22) Filed: Jan. 14, 2022

(65) Prior Publication Data
US 2023/0040589 A1 Feb. 9, 2023

(30) Foreign Application Priority Data
Aug. 6, 2021 (KR) .......................... 10-2021-0103682

(51) Int. Cl.
*B60L 53/62* (2019.01)
*B60L 53/53* (2019.01)
(Continued)

(52) U.S. Cl.
CPC .............. *B60L 53/62* (2019.02); *B60L 53/53* (2019.02); *B60L 58/12* (2019.02); *B60L 58/18* (2019.02);
(Continued)

(58) Field of Classification Search
CPC .......... B60L 53/62; B60L 58/18; B60L 53/53; B60L 58/12; H02J 7/0049; H02J 7/0063;
(Continued)

(56) References Cited

U.S. PATENT DOCUMENTS 6,229,279 B1 * 5/2001 Dierker ................. H02J 7/0025
320/126
6,545,445 B1 * 4/2003 McDermott ........ F02N 11/0866
320/103
(Continued)

FOREIGN PATENT DOCUMENTS

| EP | 2272722 A2 | 1/2011 | |
|---|---|---|---|
| EP | 3038230 A1 | 6/2016 | |
| EP | 3299223 A1 | 3/2018 | |
| JP | 6421729 B2 | 11/2018 | |
| WO | WO 2015-016965 A1 | 2/2015 | |
| WO | WO-2020202202 A1 * | 10/2020 | ............... B60K 6/20 |

OTHER PUBLICATIONS

EP Search Report Application No. 22151337.7-1012.

*Primary Examiner* — Jelani A Smith
*Assistant Examiner* — Gabriel Anfinrud
(74) *Attorney, Agent, or Firm* — Morgan, Lewis & Bockius LLP (57) ABSTRACT

A method for operating a processor controlling a dual battery mounted on a hybrid electric vehicle, includes opening a relay positioned between a first battery for a load and a second battery for starting, and checking whether the attempt to start is successful when an attempt to start the hybrid electric vehicle is detected, closing the relay so that the first battery and the second battery are electrically connected in parallel when the processor concludes that the attempt to start is unsuccessful, and charging the second battery by entering the second battery into a charging mode when a reattempt to start the hybrid electric vehicle is successful.

13 Claims, 4 Drawing Sheets

(51) Int. Cl.
  *B60L 58/12*   (2019.01)
  *B60L 58/18*   (2019.01)
  *B60W 20/10*   (2016.01)
  *F02N 11/08*   (2006.01)
  *H02J 7/00*    (2006.01)

(52) U.S. Cl.
  CPC ......... *B60W 20/10* (2013.01); *F02N 11/0862* (2013.01); *H02J 7/0049* (2020.01); *H02J 7/0063* (2013.01); *B60W 2510/244* (2013.01); *F02N 2200/061* (2013.01)

(58) Field of Classification Search
  CPC ............ B60W 20/10; B60W 2510/244; F02N 11/0862; F02N 2200/061
  See application file for complete search history.

(56) References Cited

U.S. PATENT DOCUMENTS

| | | | | |
|---|---|---|---|---|
| 2010/0181959 | A1* | 7/2010 | Gibbs | F02N 11/0866 320/104 |
| 2014/0214251 | A1* | 7/2014 | Sugiyama | B60L 58/20 903/930 |
| 2016/0009194 | A1 | 1/2016 | Katayama et al. | |
| 2019/0212392 | A1* | 7/2019 | Ha | B60L 58/12 |
| 2021/0036535 | A1* | 2/2021 | Pk | H02J 7/0047 |
| 2021/0063458 | A1* | 3/2021 | Engel | H02J 3/0012 |
| 2022/0029448 | A1* | 1/2022 | Abramov | H01M 10/4207 |
| 2022/0093978 | A1* | 3/2022 | Moon | H01M 10/441 |

\* cited by examiner

METHOD FOR CONTROL DUAL BATTERIES IN HYBRID ELECTRIC VEHICLE

CROSS-REFERENCE TO RELATED APPLICATION

The present application claims priority to Korean Patent Application No. 10-2021-0103682 filed on Aug. 6, 2021, the entire contents of which is incorporated herein for all purposes by this reference.

BACKGROUND OF THE INVENTION

Field of the Invention

The present invention relates to a technology for controlling a dual battery of a vehicle.

Description of Related Art

An electric vehicle is classified as a hybrid electric vehicle (HEV), a plug-in hybrid electric vehicle (PHEV), and an electric vehicle (EV) by how much an electric motor and a battery share the role of an existing internal combustion engine.

The electric vehicle is a vehicle that runs only on electrical energy, and the hybrid electric vehicle and the plug-in hybrid electric vehicle are vehicles in which an electric motor is used in combination with an internal combustion engine.

Recently, a low-cost hybrid electric vehicle has been developed to minimize the production cost of the hybrid electric vehicle. The low-cost hybrid electric vehicle may be implemented by removing a starter generator (e.g., a mild hybrid starter and generator (MHSG)), a low voltage DC-DC converter (LDC), and the like. However, in the instant case, because the starter generator (MHSG) is not provided, a 12V starter may be used for starting the vehicle when an EV mode is canceled while driving. At the instant time, due to an occurrence of a voltage drop, various controllers may be reset or a lamp may flicker. Therefore, a battery control technology for stabilizing a low-cost hybrid electric vehicle system is required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for controlling a dual battery mounted on a hybrid electric vehicle by controlling a relay of the dual battery according to a vehicle state and battery state.

According to various exemplary embodiments of the present invention, a method for operating a processor controlling a dual battery mounted on a hybrid electric vehicle is provided. The method includes opening a relay positioned between a first battery for a load and a second battery for starting, and checking whether the attempt to start is successful when an attempt to start the hybrid electric vehicle is detected, closing the relay so that the first battery and the second battery are electrically connected in parallel when the processor concludes that the attempt to start is unsuccessful, and charging the second battery by entering the second battery into a charging mode when a reattempt to start the hybrid electric vehicle is successful.

The method may further include charging the second battery by closing the relay when the attempt to start is successful, and opening the relay when the second battery is charged more than or equal to a discharge amount due to starting the vehicle.

The method may further include transmitting a battery check message to a display or a terminal connected to the processor when the reattempt to start the hybrid electric vehicle is unsuccessful.

The first battery may be connected to an alternator, the second battery may be connected to a starter attempting to start, and the first battery and the second battery may be connected or disconnected through the relay controlled by the processor.

Charging the second battery may include restricting to change to a driving mode where the alternator gets stopped when the second battery is in a charging mode.

Charging the second battery may include terminating charging the second battery and opening the relay when an accumulated charging time reaches to a reference time of full charge.

Charging the second battery may include setting a charging target voltage based on state information of the second battery, and transmitting a battery check message to a display or a terminal connected to the processor when the charging target voltage is not satisfied after the reference time of the full charge.

The method may further include, if state of charge (SOC) value of the first battery is higher than a first threshold when the hybrid electric vehicle is in a key off state, opening the relay, and if the SOC value of the first battery is lower than the first threshold, charging the first battery by closing the relay.

The method may further include maintaining a voltage of the first battery stably by opening the relay when cancellation of an EV mode is detected due to a change in the driving mode of the hybrid electric vehicle.

According to various exemplary embodiments of the present invention, it is possible to prevent electric load fluctuation due to a voltage drop which may occur when changing a driving mode of a vehicle, while securing vehicle starting performance by controlling a relay of a dual battery.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the description, when a part is referred to "include" or "comprise" a certain component, it means that it may further include other components rather than exclude other components, unless specifically indicates otherwise. Devices constituting a network may be implemented with hardware, software, or a combination thereof.

In the description, the terms such as " . . . unit", " . . . er/or", " . . . module", and the like refer to units that process at least one function or operation, which may be implemented with a hardware, a software or a combination thereof.

Devices described in various exemplary embodiments of the present invention are composed of hardware including at least one processor, a memory device, a communication device, and the like, and a program which is executed in combination with the hardware is stored on a predetermined place. The hardware has a configuration and performance capable of executing the method of the present invention. The program includes instructions implementing an operation method of the present invention described with reference to the drawings, and executes the present invention in combination with hardware, such as a processor and a memory device.

In the present description, "transmission", "transfer", or "provision" may include direct transmission or provision, as well as indirect transmission, transfer, or provision through other devices or by way of bypass.

Expressions described in the singular in the exemplary embodiment may be interpreted as the singular or plural unless an explicit expression such as "one" or "single" is used.

In the present description, terms including an ordinal number such as first and second may be used to describe various components, but the components are not limited by the terms. The terms are used only for distinguishing one component from another. For example, a first component may be referred to as a second component without departing from the scope of the present invention, and similarly, a second component may also be referred to as a first component.

In the flowchart described with reference to drawings in the present description, the operation order may be changed, several operations may be merged, certain operations may be divided, and specific operations may not be performed.

Figure 1:
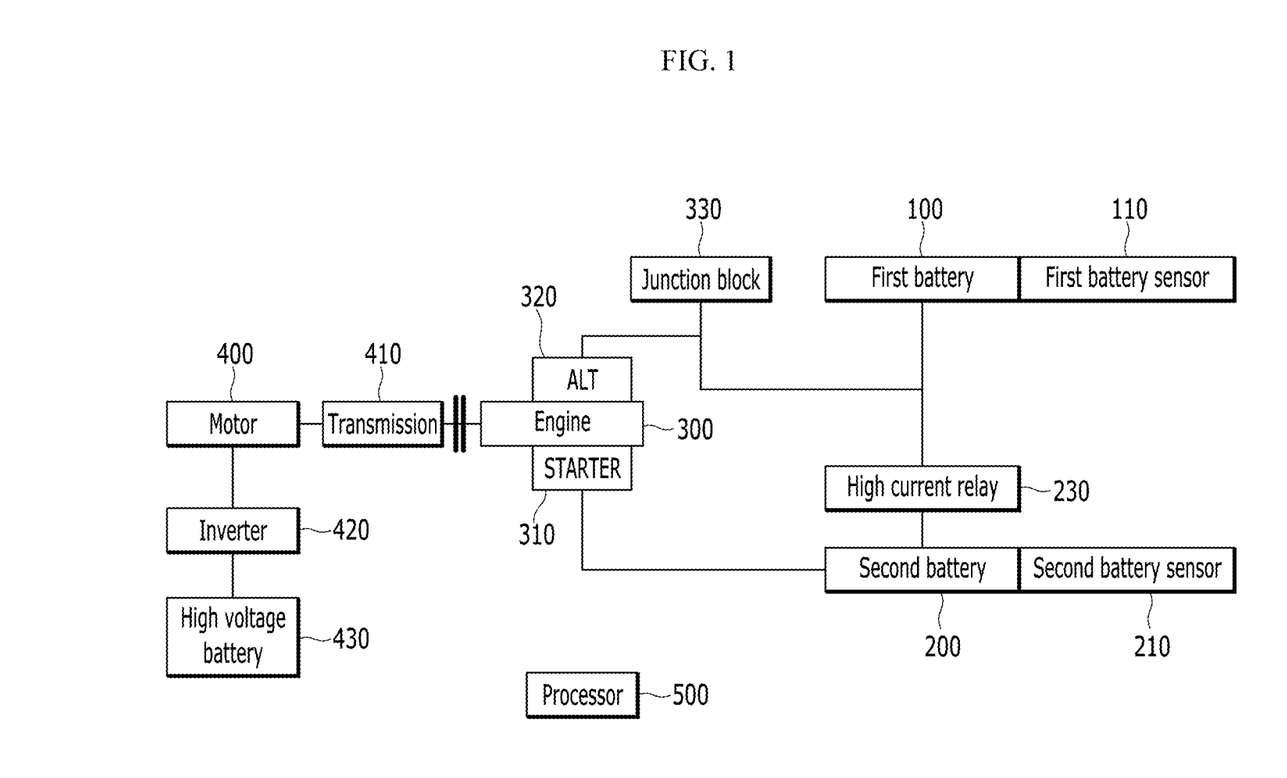
FIG. 1 is a schematic diagram of a hybrid electric vehicle including a dual battery according to various exemplary embodiments of the present invention.

FIG. 1 is a schematic diagram of a hybrid electric vehicle including a dual battery according to various exemplary embodiments of the present invention.

As shown in FIG. 1, a hybrid electric vehicle includes a first battery 100 and a second battery 200 forming a dual battery structure. The hybrid electric vehicle includes an engine 300, a motor 400, a transmission 410, an inverter 420, and a high voltage battery 430, and may further include various vehicle modules. The processor 500 may control various connected vehicle modules according to a battery state and vehicle state. The processor 500 may be included in an engine control unit (ECU).

A 12V second battery 200 may be connected to a starter 310 that attempts to start the engine 300, and a 12V first battery 100 may be connected to an alternator (ALT) 320 of the engine 300. The alternator 320 is connected to an engine pulley to generate electric power from torque and may supply the generated power to the vehicle and the battery.

A high current relay 230 (hereinafter, referred to as a "relay") is positioned between the first battery 100 and the second battery 200 to connect them. The first battery 100 and the second battery 200 may be connected to or disconnected from each other depending on opening/closing of the relay 230. The relay 230 is controlled by the processor 500.

The first battery 100 is to respond to a load and connected to a first battery sensor 110. The first battery sensor 110 may measure a state of the first battery 100, such as voltage, current, battery liquid temperature, and state of charge (SOC), and transmit measured information to the processor 500. The first battery 100 may be charged by the alternator 320.

The second battery 200 is to supply power in response to starting the engine and is connected to a second battery sensor 210. The second battery sensor 210 may measure a state of the second battery 200, such as voltage, current, battery liquid temperature, and SOC, and transmit measured information to the processor 500.

A junction block 330 may be positioned in a connection line between the alternator 320 and the dual battery. Electricity and power may be distributed to internal components of the hybrid electric vehicle through the junction block 330.

The processor 500 detects an attempt to start the engine 300, checks the SOCs of the first battery 100 and the second battery 200, and then controls (opens and closes) the relay 230.

When a driving mode of the hybrid electric vehicle is changed (e.g., the EV mode is canceled), the processor 500 may open the relay 230 to prevent electric load fluctuation and controller reset due to a voltage drop. As a result, when the EV mode is canceled, the processor 500 allows only an occurrence of a voltage drop in the second battery 200 and maintains the voltage of the first battery 100 stably to prevent lamp flickering, controller reset, and the like. Here, the EV mode means a mode in which the vehicle is driven by the motor 400 only.

The processor 500 may display a specific message on a display of a terminal mounted inside the vehicle, and may transmit the message to an external user terminal via a communication module of the terminal mounted inside the vehicle. At the instant time, the specific message may include a battery check message.

Figure 2:
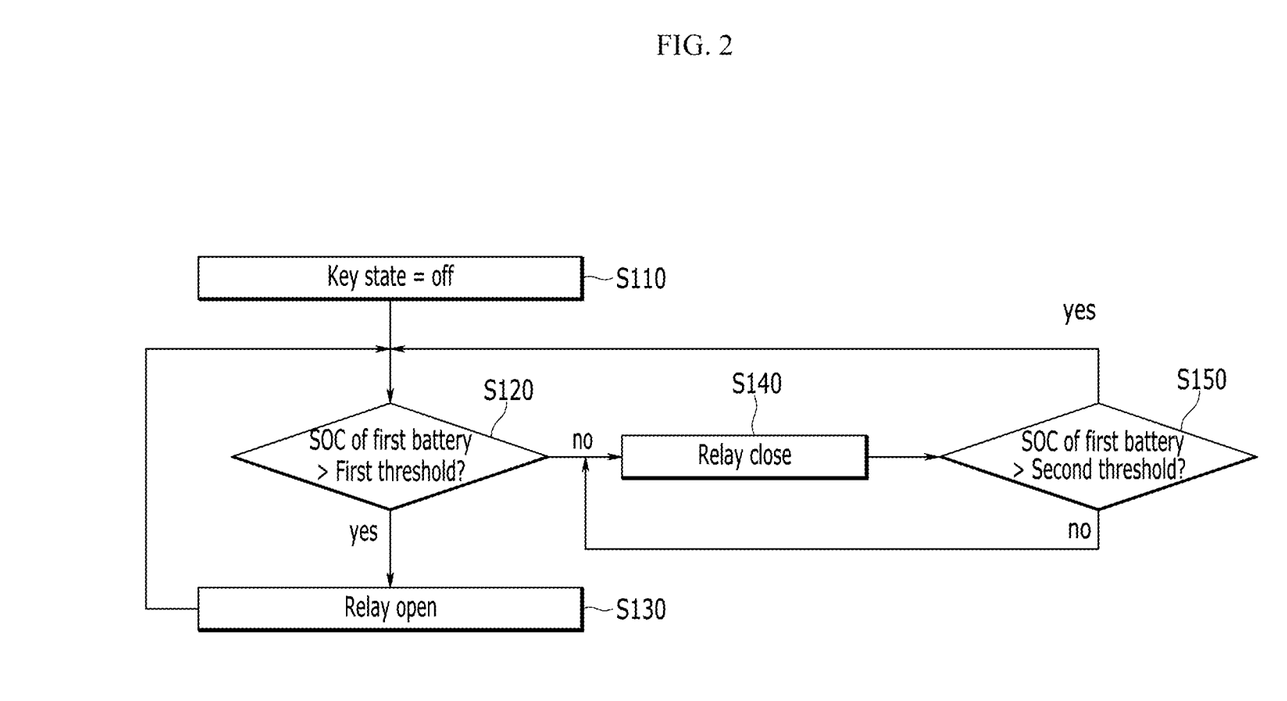
FIG. 2 is a flowchart showing a method for controlling a relay according to a state of a first battery in a key off state of a vehicle according to an exemplary embodiment

FIG. 2 is a flowchart showing a method for controlling a relay according to a state of a first battery in a key off state of a vehicle according to various exemplary embodiments of the present invention.

Referring to FIG. 2, a processor 500 identifies that a vehicle is in a key off state (S110).

The processor 500 checks whether an SOC value of a first battery 100 is equal to or greater than a first threshold (S120). The SOC is a numerical value which is expressed as a percentage representing a ratio of a charge amount of the first battery 100 to a maximum capacity. In the hybrid electric vehicle, the SOC functions as a fuel gauge. In the instant case, the SOC may be determined by measuring a change in battery capacity over time using a current integration method. For example, the SOC may be determined by measuring specific gravity and pH of battery electrolyte using a chemical method or by measuring a battery voltage using a voltage method. Alternatively, the SOC may be determined by measuring battery current and integrating the measured current over time using a current integration method. Furthermore, the SOC according to an internal pressure of the battery may be determined by use of a pressure method. The above-described methods for determining the SOC are examples, and the determination method is not necessarily limited thereto. Different determination methods may be used depending on a situation or actually applied condition. Here, a first threshold means a minimum SOC and may be expressed as, for example, 10% of a total capacity.

When the SOC is higher than the first threshold, the processor 500 opens a relay 230 (S130). The first threshold may be, for example, 10% of the total capacity. In the present way, by opening the relay 230, it is possible to minimize an occurrence of dark current which is current flowing while the vehicle ignition is off. Generally, a battery sensor determines the SOC by reading battery voltage when the vehicle ignition is off. Here, in a case where two batteries are connected to each other, not a voltage of each battery but a parallel voltage is measured. Thus, learning a precise SOC value of each battery through a voltage-state of charge (SOC) table cannot be performed. However, when the relay maintains open, because each voltage of the first battery 100 and the second battery 200 is measured, the processor 500 may learn an independent SOC based on the measured voltage of each battery.

If the SOC value of the first battery 100 is less than a first threshold, the processor 500 controls the first battery 100 to be charged by closing the relay 230 to start the vehicle (S140). When the relay 230 is closed, the first battery 100, having been discharged, is charged using the second battery 200. Because a voltage of a discharged battery is low, the discharged battery may be charged with a potential difference. Even though the second battery 200 has an SOC that allows starting the vehicle by operating a vehicle starter 310, the vehicle cannot be started if power is not supplied to each controller due to the discharge of the first battery 100.

Accordingly, the processor 500 closes the relay 230 and controls the first battery to be charged, facilitating to start the vehicle. Meanwhile, the processor 500 may transmit a message informing that the first battery 100 is discharged to a connected terminal. Here, the terminal may be a terminal including a display screen with being mounted on a vehicle or may be a user terminal connected to a hybrid electric vehicle.

Thereafter, the processor 500 checks whether the SOC value of the first battery is equal to or greater than a second threshold (S150). Here, the second threshold has a value larger than the first threshold.

When the SOC value of the first battery 100 is equal to or greater than the second threshold, the processor 500 may open the relay 230 through step S120. Meanwhile, when the SOC value of the first battery 100 does not reach the second threshold, the processor 500 makes the first battery 100 to be charged by maintaining the relay 230 closed.

Figure 3:
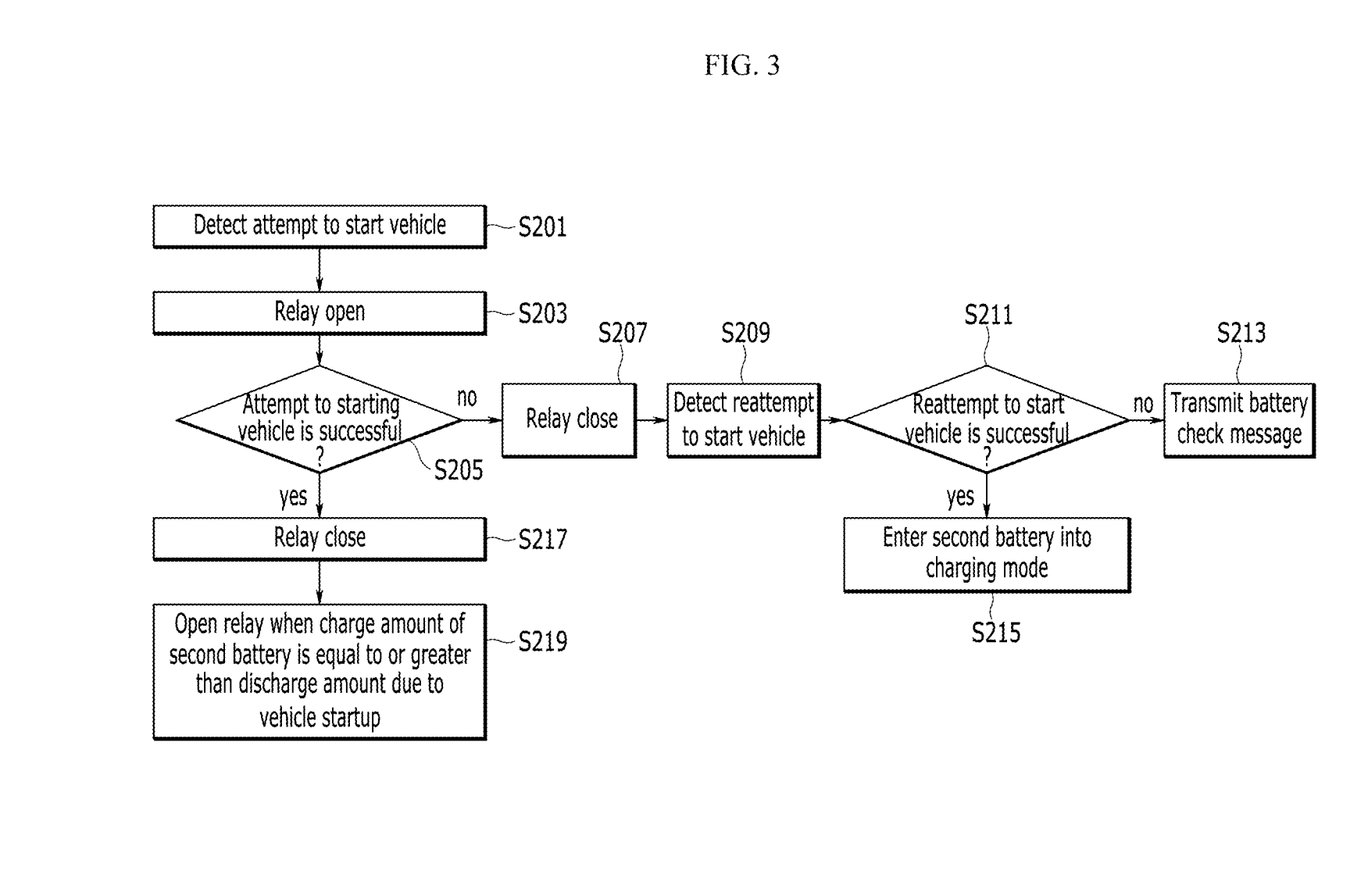
FIG. 3 is a flowchart illustrating a method for controlling a relay depending on vehicle startup according to various exemplary embodiments of the present invention.

FIG. 3 is a flowchart illustrating a method for controlling a relay depending on vehicle startup according to various exemplary embodiments of the present invention.

Referring to FIG. 3, when a processor 500 detects an attempt to start a vehicle (S201), the processor 500 opens a relay 230 (S203).

The processor 500 checks whether the attempt to start the vehicle is successful (S205). When the attempt was unsuccessful, the processor closes the relay 230 (S207). The processor 500 may connect the first battery 100 and the second battery 200 in parallel for charging the second battery 200. At the instant time, the processor 500 may transmit a battery check message.

After detecting restart while the relay is closed (S209), the processor 500 checks whether the vehicle restart is successful (S211).

If the vehicle restart is unsuccessful, the processor 500 transmits the battery check message to an in-vehicle display device or a user terminal (S213).

If the vehicle restart is successful, the processor 500 controls the second battery 200 to enter into a charging mode (S215). When the second battery 200 is in the charging mode, the processor 500 may control a driving mode of a hybrid electric vehicle not to enter an EV mode. This is because the alternator 320 is stopped and the battery gets not to be charged when the driving mode enters the EV mode. Because it is important to charge the second battery 200 to a state where the vehicle may be started, the processor 500 restricts a change to the driving mode (e.g., entry into the EV mode, cancellation of an engine mode) that stops the alternator 320. As a result, the second battery 200 may be charged through the alternator 320. Hereinafter, the charging mode of the second battery is described in detail with reference to FIG. 4.

Meanwhile, if the attempt to start the vehicle is successful in step S205, the processor 500 closes the relay 230 (S217). Upon identifying a normal vehicle startup, the processor 50 may immediately charge the battery by closing the relay 230 and open the relay after charging is completed. Thus, a sulfation phenomenon which may occur when the second battery 200 is over-discharged or left unattended may be prevented.

Thereafter, the processor 500 compares a charge amount of the second battery 200 at the current time point and a discharge amount at the startup time point. When the charge amount of the second battery is equal to or greater than the discharge amount caused by the vehicle startup, the processor opens the relay 230 (S219). Thereafter, the processor 500 maintains the relay 230 open while the hybrid electric vehicle is driving. In the present way, upon starting driving, the processor 500 opens the relay 230 after charging as much as the second battery 200 was discharged due to the vehicle startup, which makes it possible to prevent the discharge of the second battery 200 and secure durability. If the battery is left unattended for a long time after being discharged, the battery durability deteriorates due to the sulfation phenomenon. Therefore, if 1 Ah is discharged from the second battery 200 at startup, the processor 500 closes the relay 230 to charge the second battery 200 up to 1 Ah, and then opens the relay 230.

Figure 4:
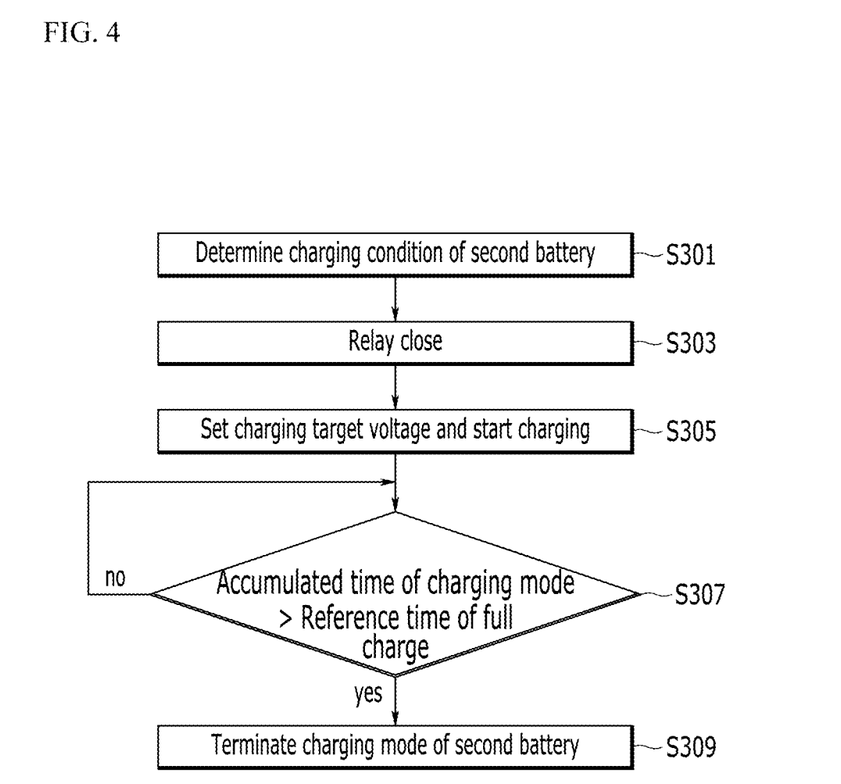
FIG. 4 is a flowchart illustrating a method for controlling a charging mode of a second battery according to various exemplary embodiments of the present invention.

FIG. 4 is a flowchart illustrating a method for controlling a charging mode of a second battery according to various exemplary embodiments of the present invention.

Referring to FIG. 4, a processor 500 determines a charging condition for entering the second battery 200 into a charging mode (S301). The charging condition may be various. For example, if the vehicle restart is successful, the processor 500 may enter the second battery 200 into the charging mode as in step S215 in FIG. 3. When an SOC value of the second battery 200 received from a second battery sensor 210 is less than or equal to a threshold, the processor 500 may enter the second battery 200 into the charging mode. State parameters used for determining an entry into the charging mode may be, for example, a SOC, a startup prediction voltage, and the like. Furthermore, the processor 500 may set a charging cycle, and then, upon reaching the charging cycle, may determine that the charging condition for entering the second battery 200 into the charging mode is satisfied.

When the charging condition for entering the second battery 200 into the charging mode is satisfied, the processor 500 closes the relay 230 (S303).

The processor 500 sets a charging target voltage based on state information of the second battery and then starts charging the second battery 200 (S305). The processor 500 may set an optimal target voltage of the second battery 200 based on the state information, such as the SOC received from the second battery sensor 210 and battery liquid temperature. For example, when the SOC is 70% and the battery liquid temperature is 25 degrees, 14.5V may be set as the charging target voltage.

Meanwhile, the processor accumulates charging time of the second battery 200 and determines whether the accumulated time reaches reference time of full charge (S307).

The processor 500 terminates the charging mode of the second battery 200 when the accumulated charging time becomes longer than the reference time of full charge (S309). That is, the processor 500 terminates charging when charging time of the second battery 200 becomes longer than the reference time of the full charge. Even though 95% is set as the target voltage, an aged battery does not reach the target voltage after the time passed. Thus, there is a problem that the charging mode is continuously maintained. Accordingly, the processor 500 may set the reference time of full charge so that all batteries may be sufficiently charged in consideration of battery aging and may control the batteries to be charged up to the reference time of the full charge. When charging a battery is completed in advance of the reference time for full charge, it may be recommended to continue charging for a predetermined time period to secure battery durability.

In the instant case, if the charging target voltage is not satisfied after terminating charging, the processor 500 may generate a second battery check message and transmit the generated message to an in-vehicle display or a user terminal.

A method for controlling a dual battery of a hybrid electric vehicle according to a vehicle state and battery state described so far is as shown in Table 1.

TABLE 1

| Vehicle and battery state | Control method | Purpose and effect |
| --- | --- | --- |
| Key off<br>First battery normal | Relay open | Independent SOC learning for first battery and second battery is performed. Because a load causing dark current is connected to the first battery, it is possible to secure starting performance of the second battery when a relay is open. |
| Key off<br>First battery discharged | Relay close | Even if the second battery is in a state of charge allowing starting the vehicle by operating a vehicle starter, the vehicle cannot be started if power is not supplied to each controller due to discharge of the first battery. Therefore, the first battery is made to be charged through the second battery by closing the relay. |
| Failure of an attempt to start with the second battery | Relay close<br>Entering second battery into charge mode<br>Prohibition of entering into an EV mode | Through an attempt to start with batteries connected in parallel by closing the relay, it is possible to secure starting performance and start the vehicle even when durability of the second battery expires. |
| Success of starting with the second battery | Relay open after closing relay | Discharge amount due to vehicle startup is charged. |
| EV mode off | Relay open | Voltage of the first battery is maintained stably to prevent lamp flickering, controller reset, and the like caused by electric load fluctuation due to voltage drop |
| Second battery charging mode | Relay open | Starting performance is secured by entering the second battery into the |

TABLE 1-continued

| Vehicle and battery state | Control method | Purpose and effect |
|---|---|---|
| | | charging mode when charging condition for the second battery is satisfied. |

As described above, according to various exemplary embodiments of the present invention, it is possible to prevent electric load fluctuation due to a voltage drop which may occur when changing a driving mode of a vehicle, while securing vehicle starting performance by controlling a relay of a dual battery.

The exemplary embodiments of the present invention described above are not implemented only through an apparatus and a method, but may be implemented through a program for realizing a function corresponding to the configuration of the exemplary embodiments of the present invention or a recording medium on which the program is recorded.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for operating a processor controlling a dual battery mounted on a hybrid electric vehicle, the method comprising:
   when a first attempt to start the hybrid electric vehicle is detected, opening, by the processor, a relay positioned between a first battery for a load and a second battery for starting, and checking, by the processor, whether the first attempt to start is successful;
   when the processor concludes that the first attempt to start is successful, closing, by the processor, the relay to make the second battery being charged by the first battery, and opening, by the processor, the relay when the second battery is charged more than or equal to a discharge amount due to starting the vehicle;
   when the processor concludes that the first attempt to start is unsuccessful, closing, by the processor, the relay so that the first battery and the second battery are electrically connected in parallel, the first battery and the second battery connected in parallel to be used for a second attempt to start;
   entering, by the processor, the second battery into a charging mode when the processor concludes that the second attempt to start the hybrid electric vehicle, following the unsuccessful first attempt, is successful; and
   opening, by the processor, the relay when cancellation of an electric vehicle (EV) mode is detected due to a change in a driving mode of the hybrid electric vehicle, to maintain a voltage of the first battery.

2. The method of claim 1, further including transmitting a battery check message to a display or a terminal connected to the processor when the processor concludes that the second attempt to start the hybrid electric vehicle is unsuccessful.

3. The method of claim 1, wherein the first battery is connected to an alternator, the second battery is connected to a starter attempting to start, and the first battery and the second battery are connected or disconnected through the relay controlled by the processor.

4. The method of claim 3, wherein the entering the second battery into the charging mode includes:
   when the second battery is in the charging mode, restricting a change of the driving mode to the electric vehicle (EV) mode.

5. The method of claim 3, wherein the entering the second battery into the charging mode includes:
   when an accumulated charging time reaches a reference time of full charge, opening the relay to terminate charging the second battery.

6. The method of claim 5, wherein the entering the second battery into the charging mode includes:
   setting a charging target voltage based on state information of the second battery, and transmitting a battery check message to a display or a terminal connected to the processor when the charging target voltage is not satisfied after the reference time of the full charge.

7. The method of claim 1, further including:
   when state of charge (SOC) value of the first battery is higher than a first threshold and the hybrid electric vehicle is in a key off state, opening, by the processor, the relay; and
   when the SOC value of the first battery is lower than the first threshold, closing, by the processor, the relay, the first battery being charged.

8. A hybrid electric vehicle comprising:
   a first battery and a second battery;
   a motor;
   an engine including an alternator connected to the first battery and a starter connected to the second battery;
   a relay provided between the first battery and the second battery; and
   a processor connected to the relay to selectively connect the first battery and the second battery through the relay controlled by the processor,
   wherein the processor is configured to:
      when a first attempt to start the hybrid electric vehicle is detected, open the relay for starting, and check whether the first attempt to start is successful;

when the processor concludes that the first attempt to start is successful, close the relay to make the second battery being charged by the first battery, and open the relay when the second battery is charged more than or equal to a discharge amount due to starting the vehicle;

when the processor concludes that the first attempt to start is unsuccessful, close the relay so that the first battery and the second battery are electrically connected in parallel, the first battery and the second battery connected in parallel to be used for a second attempt to start;

enter the second battery into a charging mode when the processor concludes that the second attempt to start the hybrid electric vehicle, following the unsuccessful first attempt, is successful; and open the relay when cancellation of an electric vehicle (EV) mode is detected due to a change in a driving mode of the hybrid electric vehicle, to maintain a voltage of the first battery.

9. The hybrid electric vehicle of claim 8, wherein the processor is further configured to transmit a battery check message to a display or a terminal connected to the processor when the processor concludes that the second attempt to start the hybrid electric vehicle is unsuccessful.

10. The hybrid electric vehicle of claim 8, wherein the processor is further configured to, when the second battery is in the charging mode, restrict a change of the driving mode to the electric vehicle (EV) mode.

11. The hybrid electric vehicle of claim 8, wherein the processor is further configured to, when the second battery is in the charging mode and an accumulated charging time reaches a reference time of full charge, terminate charging the second battery and open the relay.

12. The hybrid electric vehicle of claim 11, wherein the processor is further configured to, when the second battery is in the charging mode, set a charging target voltage based on state information of the second battery, and transmit a battery check message to a display or a terminal connected to the processor when the charging target voltage is not satisfied after the reference time of the full charge.

13. The hybrid electric vehicle of claim 8, wherein when state of charge (SOC) value of the first battery is higher than a first threshold and the hybrid electric vehicle is in a key off state, the processor is configured to open the relay, and wherein when the SOC value of the first battery is lower than the first threshold, the processor is configured to close the relay, the first battery being charged.

* * * * *